United States Patent
Kakadia et al.

(10) Patent No.: US 9,722,887 B2
(45) Date of Patent: Aug. 1, 2017

(54) ADAPTIVE QUALITY OF SERVICE (QOS) BASED ON APPLICATION LATENCY REQUIREMENTS

(75) Inventors: Deepak Kakadia, Union City, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1658 days.

(21) Appl. No.: 13/048,350

(22) Filed: Mar. 15, 2011

(65) Prior Publication Data
US 2012/0236713 A1    Sep. 20, 2012

(51) Int. Cl.
*H04L 12/26* (2006.01)
*H04W 28/12* (2009.01)
*H04L 12/24* (2006.01)
*H04L 12/833* (2013.01)
*H04L 12/801* (2013.01)
*H04L 12/851* (2013.01)
*H04L 12/853* (2013.01)

(52) U.S. Cl.
CPC ...... *H04L 41/5035* (2013.01); *H04L 41/5025* (2013.01); *H04L 43/0852* (2013.01); *H04L 47/2458* (2013.01); *H04L 47/12* (2013.01); *H04L 47/2408* (2013.01); *H04L 47/2416* (2013.01)

(58) Field of Classification Search
CPC ........................................................ H04L 12/26
USPC .................................. 370/230, 235, 236, 392
See application file for complete search history.

(56) References Cited

U.S. PATENT DOCUMENTS

2009/0010259 A1*  1/2009  Sirotkin ................... 370/392
2012/0207022 A1*  8/2012  Grayson et al. ........... 370/235

* cited by examiner

*Primary Examiner* — Andrew Lai
*Assistant Examiner* — Albert Shih (57) ABSTRACT

A device is configured to receive packet timing data, from multiple network devices, for subscriber application traffic over an Internet Protocol (IP) wireless access network and to calculate, based on the packet timing data, timing latencies for a particular subscriber flow. The device is configured to retrieve Quality of Service (QoS) timing specifications for the particular subscriber flow and to determine when the calculated timing latencies for the particular subscriber flow fail to meet the QoS timing specifications for the particular subscriber flow. The device is configured to identify one or more of the network devices that are causing the particular subscriber flow to fail to meet the QoS timing specifications and to instruct the one or more of the network devices to modify QoS parameters for the particular subscriber flow to improve timing latency for the particular subscriber flow.

20 Claims, 7 Drawing Sheets

ADAPTIVE QUALITY OF SERVICE (QOS) BASED ON APPLICATION LATENCY REQUIREMENTS

BACKGROUND

A fourth generation (4G) wireless network is an Internet protocol (IP) wireless access network in which different advanced multimedia application services (e.g., voice over IP (VoIP) content, video content, etc.) are delivered over IP. In a multiple access network, these different multimedia application services compete for the same air interface and transport network resources. During periods of network congestion, Quality of Service (QoS) factors may be implemented to prioritize network traffic based on a classification indicated by service providers.

4G network applications with QoS specifications typically include a timing component (e.g., that defines a particular maximum latency for network traffic related to a particular application). However, current QoS mechanisms for implementing particular QoS policies do not include any way to ensure that a particular timing latency is enforced. Thus, mobile service providers continue to seek improved techniques to differentiate services based on priority of traffic.

DETAILED DESCRIPTION OF PREFERRED EMBODIMENTS

The following detailed description refers to the accompanying drawings. The same reference numbers in different drawings may identify the same or similar elements.

Systems and/or methods described herein may provide mechanisms to dynamically adjust QoS settings for traffic of individual subscribers such that a particular application meets, but does not exceed, latency tolerance requirements for the particular application.

In one example implementation, network devices may provide packet timing data for subscriber applications over an Internet Protocol (IP) wireless access network. The packet timing data may be stored in a memory. A latency information system may retrieve, from the memory, the packet timing data, and may calculate, based on the packet timing data, timing latencies for a particular subscriber flow over the IP wireless access network. The latency information system may retrieve QoS timing specifications for the particular subscriber flow and determine when the calculated timing latencies for the particular subscriber flow fail to meet the QoS timing specifications for the particular subscriber flow. The latency information system may then identify which of the network devices is causing the particular subscriber flow to not meet the QoS timing specifications, and may signal one or more of the network devices to modify QoS parameters for the particular subscriber flow to improve timing latency for the particular subscriber flow.

As used herein, the terms "subscriber" and/or "user" may be used interchangeably. Also, the terms "subscriber" and/or "user" are intended to be broadly interpreted to include user equipment (UE) or a user of UE.

Figure 1:
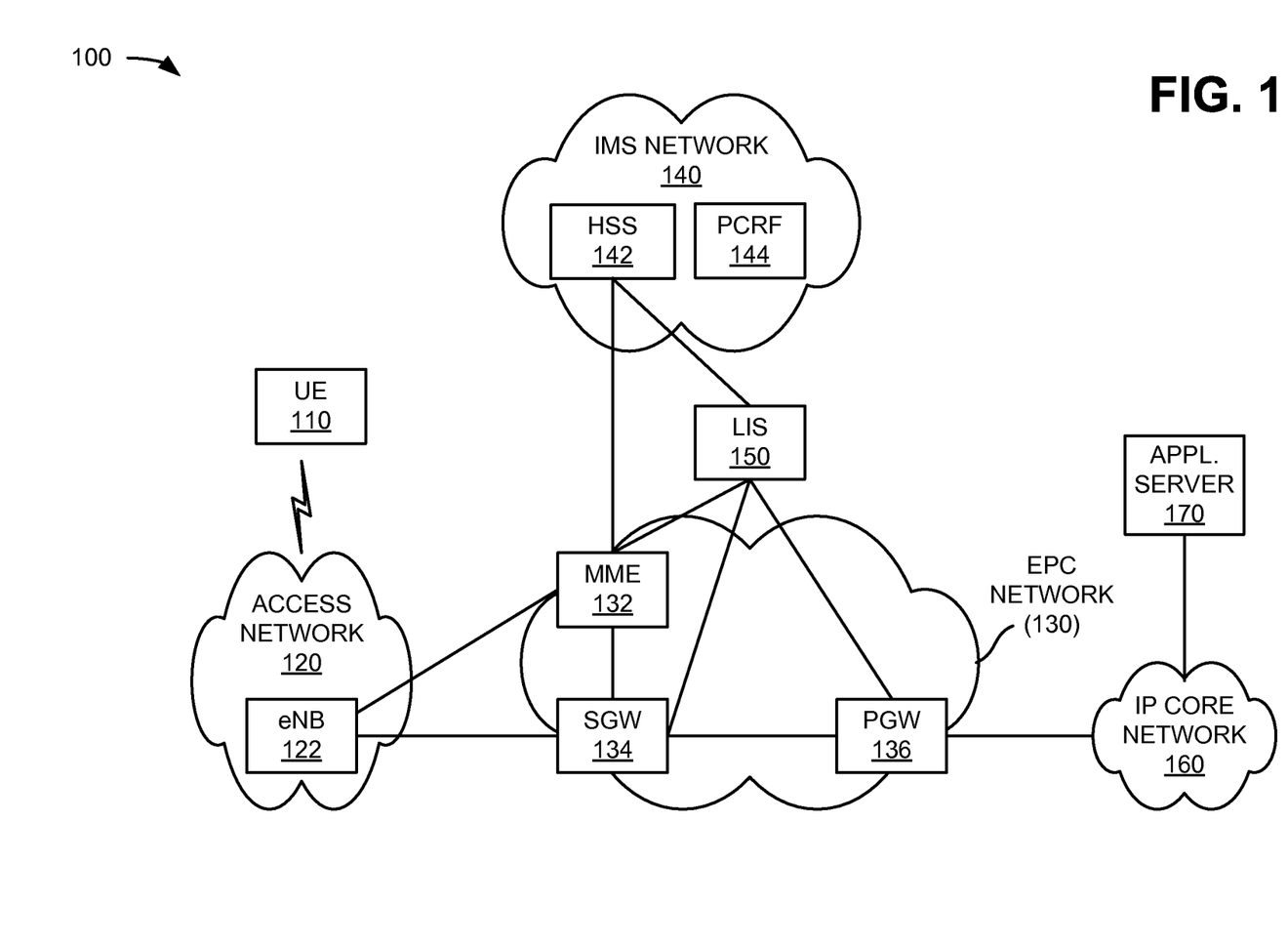
FIG. 1 is a diagram of an example network in which systems and/or methods described herein may be implemented.

FIG. 1 is a diagram of an example network 100 in which systems and/or methods described herein may be implemented. As illustrated, network 100 may include a UE 110, an access network 120, an evolved packet core (EPC) network 130, an IP multimedia subsystem (IMS) network 140, a latency information system (LIS) 150, an IP core network 160, and an application server 170. Access network 120 may include an eNodeB (eNB) 122. EPC network 130 may include a mobility management entity (MME) 132, a serving gateway (SGW) 134, and a packet data network (PDN) gateway (PGW) 136. IMS network 140 may include a home subscriber server (HSS) 142 and a policy and charging rules function (PCRF) 144. Devices and/or networks of network 100 may interconnect via wired and/or wireless connections.

A single UE 110, access network 120, eNB 122, EPC network 130, MME 132, SGW 134, PGW 136, IMS network 140, HSS 142, PCRF 144, latency information system 150, IP core network 160, and application server 170 have been illustrated in FIG. 1 for simplicity. In practice, there may be more UEs 110, access networks 120, eNBs 122, EPC networks 130, MMEs 132, SGWs 134, PGWs 136, IMS networks 140, HSSs 142, PCRFs 144, latency information systems 150, IP core networks 160, and/or application servers 170.

UE 110 may include a radiotelephone, a personal communications system (PCS) terminal (e.g., that may combine a cellular radiotelephone with data processing and data communications capabilities), a wireless device, a smart phone, a personal digital assistant (PDA) (e.g., that can include a radiotelephone, a pager, Internet/intranet access, etc.), a laptop computer (e.g., with a wireless air card), or a global positioning system (GPS) device, other types of computation or communication devices. In an example implementation, UE 110 may include a device that is capable of communicating over access network 120, EPC network 130, IMS network 140, and/or IP core network 160.

Access network 120 may include a wireless communications network that connects subscribers (e.g., UE 110) to a service provider. In one example, access network 120 may include a long-term evolution (LTE) network, a WiFi network (e.g., using IEEE 802.11 standards) or other access networks (e.g., an E-UTRAN, an enhanced high-rate packet data (eHRPD) network, or another 3G, 4G, or future access network). In another example, access network 120 may include a radio access network capable of supporting high data rate, low latency, packet optimization, large capacity and coverage, etc.

eNB 122 may include one or more computation and/or communication devices that receive voice and/or data from MME 132 and/or SGW 134 and wirelessly transmit that voice and/or data to UE 110. eNB 122 may also include one or more devices that wirelessly receive voice and/or data from UE 110 and transmit that voice and/or data to one of MME 132 and/or SGW 134 or to other UEs 110. eNB 122 may combine the functionalities of a base station and a radio network controller (RNC) provided in 2G or 3G radio access networks.

EPC network 130 may include a core network architecture of the 3rd Generation Partnership Project (3GPP) LTE wireless communication standard. In one example, EPC network 130 may include an all-IP packet-switched core network that supports high-speed wireless and wireline broadband access technologies. In another example, EPC network 130 may provide packet-switched voice services (e.g., which are traditionally circuit-switched) using IMS network 140.

MME 132 may include one or more computation and/or communication devices that may be responsible for idle mode tracking and paging procedures (e.g., including retransmissions) for UE 110. MME 132 may be involved in a bearer activation/deactivation process (e.g., for UE 110) and may choose a SGW (e.g., SGW 134) for UE 110 at an initial attach and at a time of intra-LTE handover. MME 132 may provide a control plane function for mobility between LTE and access networks.

SGW 134 may include one or more data transfer devices (or network devices), such as a gateway, a router, a switch, a firewall, a network interface card (NIC), a hub, a bridge, a proxy server, an optical add-drop multiplexer (OADM), or some other type of device that processes and/or transfers data. In one example implementation, SGW 134 may route and forward user data packets, may act as a mobility anchor for a user plane during inter-eNB handovers, and may act as an anchor for mobility between LTE and other 3GPP technologies. SGW 134 may include a local resource timer to manage network resources. SGW 134 may manage and store contexts associated with UE 110 (e.g., parameters of an IP bearer service, network internal routing information, etc.).

PGW 136 may include one or more data transfer devices (or network devices), such as a gateway, a router, a switch, a firewall, a NIC, a hub, a bridge, a proxy server, an OADM, or some other type of device that processes and/or transfers data. In one example implementation, PGW 136 may provide connectivity of UE 110 to external PDNs (e.g., in IP core network 160) by being a traffic exit/entry point for UE 110. UE 110 may simultaneously connect to more than one PGW 136 for accessing multiple PDNs. PGW 136 may perform policy enforcement, packet filtering for each user, charging support, lawful intercept, and packet screening. PGW 136 may also act as an anchor for mobility between 3GPP and non-3GPP technologies.

IMS network 140 may include an architectural framework or network (e.g., a telecommunications network) for delivering IP multimedia services.

HSS 142 may include one or more devices that function as a HSS for access network 120 and/or that act as an authentication, authorization and accounting (AAA) server for access network 120. For example, HSS 142 may store information associated with a subscriber, services that the subscriber has requested or been assigned and settings associated with the services, and/or a current location of the subscriber. Furthermore, HSS 142 may verify a subscriber's identity, authenticate and/or authorize UE 110 using a device identification number (e.g., by performing MAC authentication), authorize a particular service, and/or track consumption of network resources for a particular subscriber. In one implementation, HSS 142 may interface with UE 110, SGW 134, PGW 136, and/or application server 170 and may provide information to application server 170 that enables application server 170 to communicate with UE 110 using IP-based communication protocols.

PCRF 144 may include one or more computation or communication devices that may provide policy control decision and flow based charging control functionalities. PCRF 144 may perform operations that enforce network policies associated with a communication session with UE 110. PCRF 144 may provide network control regarding service data flow detection, gating, QoS and flow based charging, etc. PCRF 144 may determine how a certain service data flow shall be treated, and may ensure that user plane traffic mapping and treatment is in accordance with a user's subscription profile.

Latency information system 150 may include one or more server devices, or other types of computation or communication devices that gather, process, search, and/or provide information in a manner described herein. In one example implementation, latency information system 150 may receive, from other network elements (e.g., eNB 122, MME 132, SGW 134, PGW 136, and/or HSS 142), real-time information associated with traffic conditions (e.g., throughput, latency, bandwidth, etc.) for applications, data, and/or services that can be used by UE 110. In one implementation, latency information system 150 may compile this information and continuously monitor application flow latencies. Latency information system 150 may determine if any flows are out of timing requirement specifications and send a feedback message to QoS mechanisms in other network elements (e.g., eNB 122, MME 132, SGW 134, PGW 136, and/or HSS 142) to adjust QoS settings such that the packet latencies are tuned to be within the timing specifications.

Although shown as a separate component in FIG. 1, in other implementations, latency information system 150 may be a distributed component or may be combined with one or more other devices and/or functions. For example, the functions of latency information system 150 may be combined with HSS 142, PCRF 144, another device in network 100, or a combination of devices. Latency information system 150 is described further in connection with, for example, FIGS. 2, 4, and 5.

IP core network 160 may include one or more networks (e.g., a local area network (LAN), a wide area network (WAN), a metropolitan area network (MAN), the Internet, etc.) capable of communicating with UE 110.

Application server 170 include one or more server devices, or other types of computation or communication devices that gather, process, search, and/or provide information in a manner described herein. Application server 170 may communicate via IP core network 160 and EPC network 130. In one example implementation, application server 170 may provide applications, data, and/or services to UE 110 that may require a particular QoS with a particular timing component (e.g., for latency between packets in a particular flow). In one example, application server 170 may be a web server that hosts a website from which UE device 110 can receive applications, data, and/or services. In another example, application server 170 may be a content delivery server that provides broadcast video streams, Video on Demand (VoD) content, or other multimedia content. In other implementations, application server 170 may provide location-based services.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more other tasks described as being performed by one or more other devices/networks of network 100.

Figure 2:
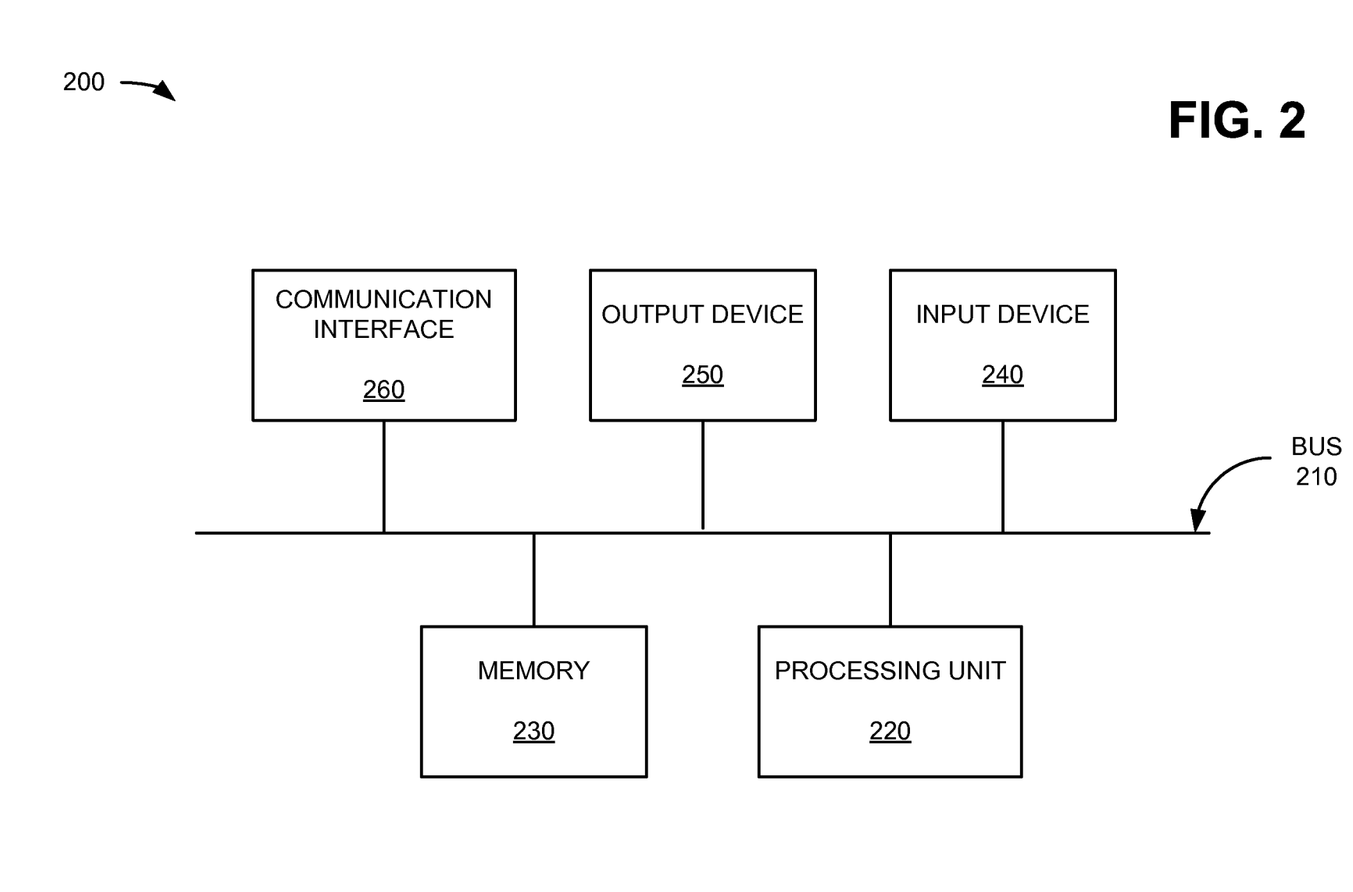
FIG. 2 is a diagram of example components of a device that may correspond to one of the devices of the network depicted in FIG. 1.

FIG. 2 is a diagram of example components of a device 200 that may correspond to one of the devices of network 100. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3:
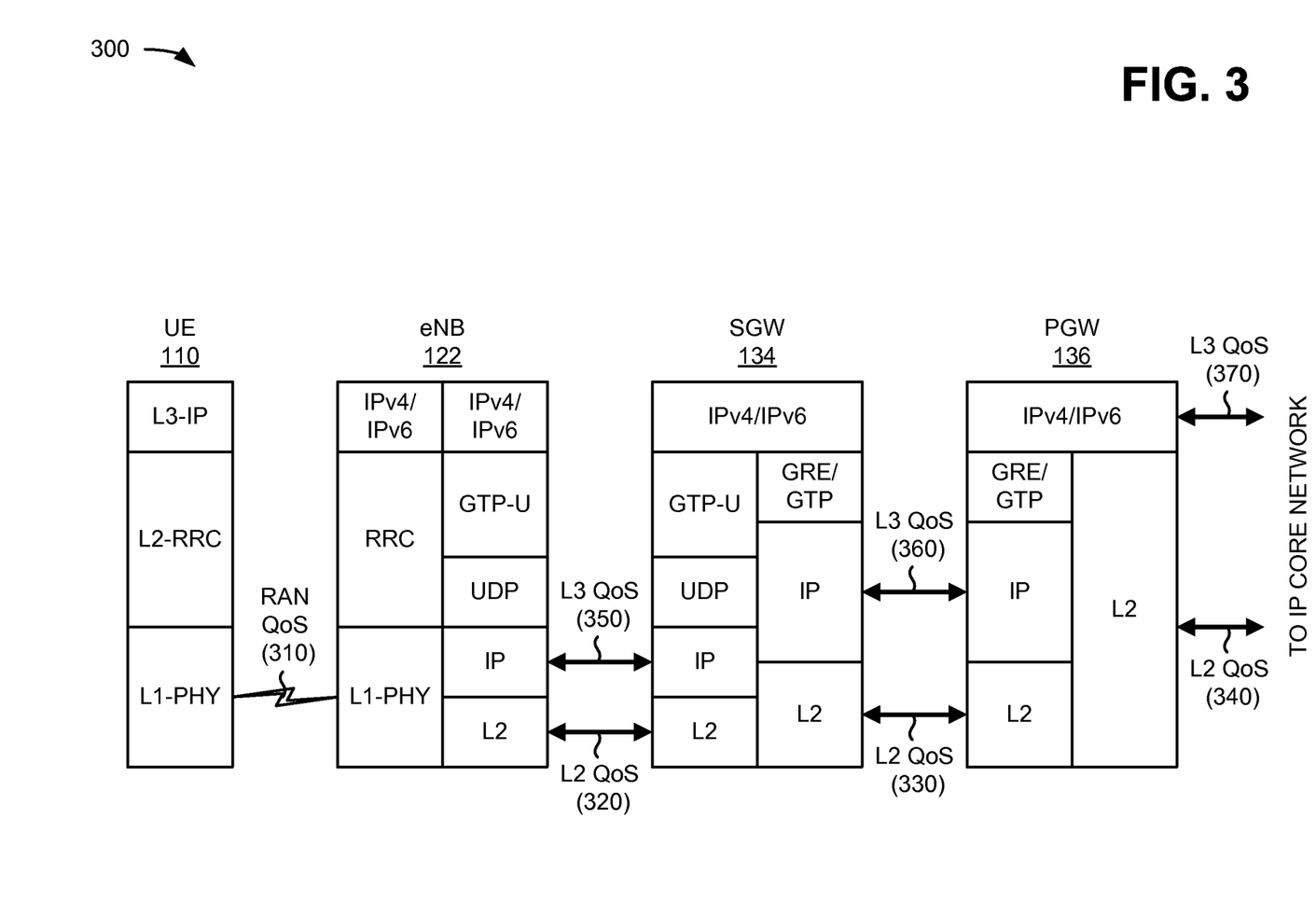
FIG. 3 illustrates a protocol architecture for providing adaptive QoS based on application latency requirements, in an example portion of the network depicted in FIG. 1.

FIG. 3 illustrates a protocol architecture for providing adaptive QoS, in an example portion 300 of network 100, based on application latency requirements. Network portion 300 may include UE 110, eNB 122, SGW 134, and PGW 136. UE 110, eNB 122, SGW 134, and PGW 136 may include the features described above in connection with one or more of FIGS. 1 and 2.

As shown in FIG. 3, each of UE 110, eNB 122, SGW 134, and PGW 136 are shown with protocol stacks corresponding to certain layers of a layered protocol model, such as Layers of the Open Systems Interconnection (OSI) model, for the user plane. For example, interfaces between UE 110 and eNB 122 may include a physical media layer (physical layer, L1), a radio resource control (RRC) layer (or data link layer, L2), and an IP layer (L3). Interfaces between eNB 122 and SGW 134 may include a data link layer (L2), and IP layer (L3), a UDP layer, and a GPRS tunneling protocol-user (GTP-U) layer. Interfaces between SGW 134 and PGW 136 may include a data link layer (L2), and IP layer (L3), and a Generic Routing Encapsulation (GRE)/GTP layer. Interfaces between PGW 136 and IP core network 160 may include a data link layer (L2), and an IPv4/IPv6 layer.

Figure 4:
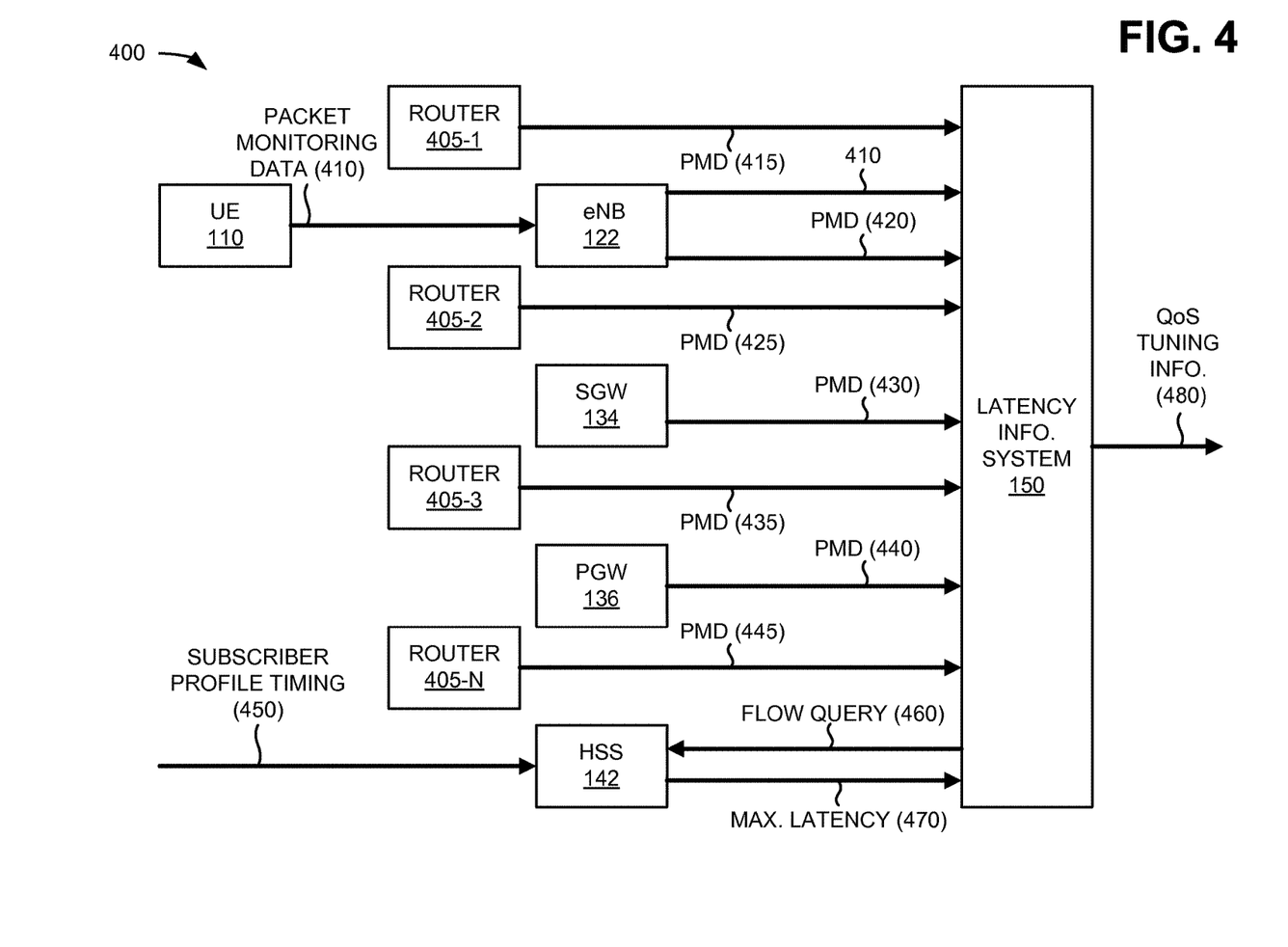
FIG. 4 is a diagram of example interactions among components of an example portion of the network depicted in FIG. 1.

As shown in FIG. 4, a RAN QoS mechanism 310 may be employed between UE 110 and eNB 122 at a Layer 1 level. RAN QoS mechanism 310 may be applied to both upstream and downstream communications.

An L2 QoS mechanism 320 may be employed between eNB 122 and SGW 134 at the L2 data link layer. Another L2 QoS mechanism 330 may be employed between SGW 134 and PGW 136 at the L2 data link layer. Still another L2 QoS mechanism 340 may be employed between PGW 136 and IP network 160 at the L2 data link layer. Each of L2 QoS mechanisms 320, 330 and 340 may employ tags in virtual LAN (VLAN) headers to indicate QoS priorities in accordance with IEEE Ethernet 802.1pQ virtual LAN standards.

An L3 QoS mechanism 350 may be employed between eNB 122 and SGW 134 at the L3 network layer. Another L3 QoS mechanism 360 may be employed between SGW 134 and PGW 136 at the L3 network layer. Still another L3 QoS mechanism 370 may be employed between PGW 136 and IP network 160 at the L3 network layer. Each of L3 QoS mechanisms 350, 360 and 370 may employ Differentiate Service Code Point (DSCP) values in the IP header, as described, for example, in RFC 2474.

QoS specifications for applications (e.g., such as telephony or streaming media applications) may include requirements for a particular end-to-end timing latency. Some applications require more resources than others. If resources are allocated indirectly across all network elements in an end-to-end flow, some applications may be under-provisioned, while other applications may be over-provisioned. Systems and/or methods described herein may dynamically adjust QoS settings for one or more of RAN QoS mechanism 310, L2 QoS mechanisms 320-340, and L3 QoS mechanisms 350-370 such that an application can meet but not over-exceed latency tolerance requirements.

Although FIG. 3 shows one protocol architecture of example network portion 300, in other implementations, different architectures may be used.

FIG. 4 is a diagram of example interactions among components of an example portion 400 of network 100. As shown, example network portion 400 may include UE 110, eNB 122, SGW 134, PGW 136, HSS 142, latency information system 150, and multiple routers 405-1 through 405-N (referred to herein collectively as "routers 405" and, in some cases, individually as "router 405"). UE 110, eNB 122, SGW 134, PGW 136, HSS 142, and latency information system 150 may include the features described above in connection with one or more of FIGS. 1-3.

Router 405 may include one or more data transfer devices (or network devices), that processes and/or transfers data. For example, router 405-1 may be an intervening device in a link between eNB 122 and SGW 134; router 405-2 may be an intervening device in a link between SGW 134 and PGW 136; etc. Each router 405 may include hardware or a combination of hardware and software to collect and report packet monitoring data for traffic passing through router 405.

As further shown in FIG. 4, information about individual subscriber application flow latencies may be collected at various points in network portion 400. For each packet sent between UE 110 and eNB 122, UE 110 may collect and provide packet monitoring data 410. For each packet, i, packet monitoring data 410 may include, for example, a subscriber identifier (Si) associated with the packet, a flow (Fi) associated with the packet, a timestamp (Ti) associated with the packet, and a device/network segment (Di) associated with the packet. Alternatively, UE 110 may collect a statistically significant sample size of packet monitoring data 410. UE 110 may provide packet monitoring data 410 to eNB 122. In one implementation, packet monitoring data 410 may be provided in real time or near real time.

eNB 122 may receive packet monitoring data 410 and forward packet monitoring data 410 to latency information system 150. eNB 122 may also collect packet monitoring data (PMD) 420 for each packet (or a sample set of packets) sent between UE 110 and eNB 122 and for each packet (or a sample set of packets) sent between eNB 122 and SGW 134. Similar to packet monitoring data 410, for each packet, i, packet monitoring data 420 may include a subscriber identifier (Si), a flow (Fi), a timestamp (Ti), and a device/network segment (Di). eNB 122 may forward packet monitoring data 420 to latency information system 150. In one implementation, packet monitoring data 410 and packet monitoring data 420 may be forwarded to latency information system 150 via one or more entities of EPC network 130, such as MME 132 or SGW 134.

SGW 134 may collect packet monitoring data (PMD) 430 for each packet (or a sample set of packets) sent between eNB 122 and SGW 134 and for each packet (or a sample set of packets) sent between SGW 134 and PGW 136. Similar to packet monitoring data 410 and 420, for each packet, i, packet monitoring data 430 may include a subscriber identifier (Si), a flow (Fi), a timestamp (Ti), and a device/network segment (Di). SGW 134 may forward packet monitoring data 430 to latency information system 150. In one implementation, packet monitoring data 430 may be forwarded to latency information system 150 via one or more other entities of EPC network 130.

PGW 136 may collect packet monitoring data (PMD) 440 for each packet (or a sample set of packets) sent between SGW 134 and PGW 136 and for each packet (or a sample set of packets) sent between PGW 136 and a PDN in IP core network 160. Similar to packet monitoring data 410, 420, and 430, for each packet, i, packet monitoring data 440 may include a subscriber identifier (Si), a flow (Fi), a timestamp (Ti), and a device/network segment (Di). PGW 136 may forward packet monitoring data 440 to latency information system 150. In one implementation, packet monitoring data 440 may be forwarded to latency information system 150 via one or more other entities of EPC network 130.

In one implementation, routers 405 may collect packet monitoring data (PMD) 415, 425, 435, and/or 445 for each packet (or a sample set of packets) sent over a particular link between UE 110 and IP core network 160. Similar to packet monitoring data 410, 420, 430, and 440 for each packet, i, packet monitoring data 415, 425, 435, and/or 445 may include a subscriber identifier (Si), a flow (Fi), a timestamp (Ti), and a device/network segment (Di). Each router 405 may forward packet monitoring data 415, 425, 435, and/or 445 to latency information system 150.

HSS 142 may receive subscriber profile timing information 450, from, for example, a network management system or a network administrator. Subscriber profile timing information 450 may include for example, maximum latency values associated with a QoS setting for a particular level of service. For example, a subscriber's service agreement may differentiate, based on subscription costs, levels of service (e.g., "good," "better," "best," etc.). A maximum acceptable latency for packets with a particular QoS indicator (such as quality control indicator (QCI) marking) may differ based on the subscriber's level of service. That is, a "good" subscription level may permit a 105 millisecond (ms) maximum latency, while a "better" subscription level may permit a 90 ms maximum latency for the same QoS indicator.

Latency information system 150 may receive packet monitoring data 410-445, and may store packet monitoring data 410-445 in a database of real-time information. Latency information system 150 may associate data from the same traffic flow to determine end-to-end and/or network segment latencies for particular subscriber flows. Latency information system 150 may request, from HSS 142, timing information for a particular flow, as indicated by flow query 460.

HSS 142 may provide a particular maximum latency value 470 (e.g., selected from subscriber profile timing 450) to latency information system 150 that corresponds to the QoS parameters for the flow identified in flow query 460. In one implementation, HSS 142 may provide maximum latency value 470 in response to flow query 460 from latency information system 150. In another implementation, HSS 142 may provide maximum latency value 470 to latency information system 150 whenever there is a new bearer is established for UE 110.

Latency information system 150 may calculate flow latencies for a particular flow (e.g., based on packet monitoring data 410-445), and compare the calculated flow latencies to maximum latency value 470 to determine if the subscriber flow is within time limits defined by subscriber profile timing information 450. If a subscriber flow is identified with packets that are outside a prescribed time limit (e.g., based on the QoS level and maximum latency value 470), latency information system 150 may send QoS tuning information 480 to one or more entities of EPC network 130 (e.g., eNB 122, SGW 134, PGW 136, etc.). QoS tuning information 480 may include a feedback message to adjust QoS settings for the particular traffic flow, such that the latency times are tuned to be within the prescribed time limit for the particular flow. For example, QoS tuning information 480 may include instructions to adjust QoS parameters to increase QoS priorities for the particular flow. Additionally, or alternatively, QoS tuning information 480 may include instructions to adjust QoS parameters of another flow that has under-utilized resources to benefit timing of the particular subscriber flow that fails to meet timing specifications.

Although FIG. 4 shows example components of network portion 400, in other implementations, network portion 400 may include fewer components, different components, differently arranged components, or additional components than depicted in FIG. 4. Additionally, or alternatively, one or more components of network portion 400 may perform one or more other tasks described as being performed by one or more other components of network portion 400.

Figure 5:
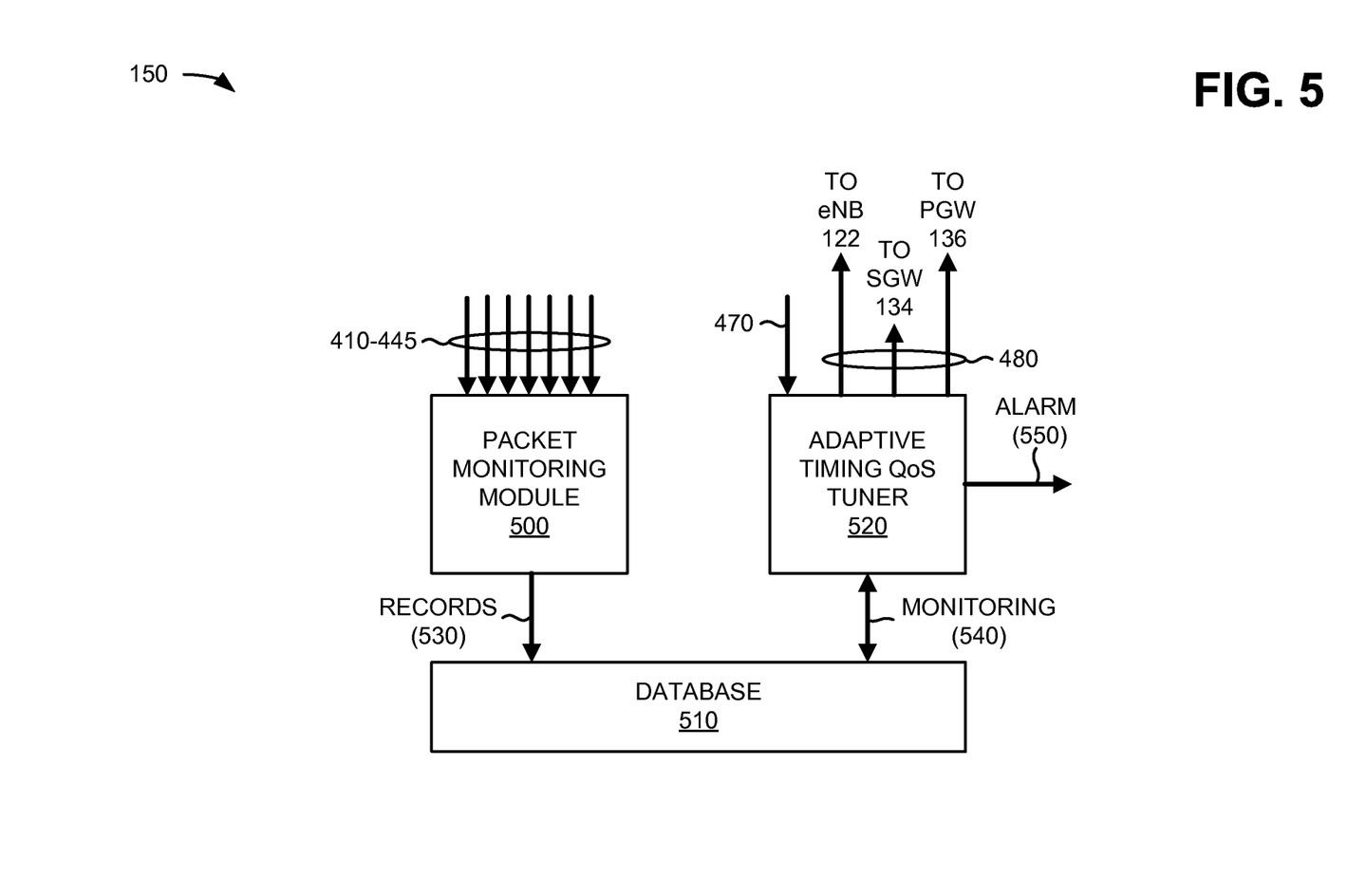
FIG. 5 is a diagram of example functional components of a latency information server depicted in FIG. 1.

FIG. 5 is a diagram of interactions among example functional components of latency information system 150. In one implementation, the functions described in connection with FIG. 5 may be performed by one or more components of device 200 (FIG. 2). As illustrated in FIG. 5, latency information system 150 may include a packet monitoring module 500, a database 510, and an adaptive timing QoS tuner 520.

Packet monitoring module 500 may include hardware or a combination of hardware and software to receive packet timing information from devices in network 100. In one implementation, packet monitoring module 500 may receive packet monitoring data 410-445 and configure the received data as records 530 for storage in database 510. For example, for each record 530, packet monitoring module 500 may store a subscriber identifier (Si) associated with the packet, a flow (Fi) associated with the packet, a timestamp (Ti) associated with the packet, and a device/network segment (Di) associated with the packet. In another implementation, packet monitoring module 500 may implement known network monitoring protocols, such as NetFlow or Internet Protocol Flow Information eXport (IPFIX).

Database 510 may store records 530, associated with packet monitoring data and particular subscriber flows, received from packet monitoring module 500. Database 510 may include real-time or near-real-time packet flow status based on information provided from other network elements of access network 120, EPC network 130, and/or IMS network 140. Database 510 may be accessed by adaptive timing QoS tuner 520. In one implementation, database 510 may store data in a round-robin fashion such that oldest store data is overwritten by new data when all available memory space, within database 510, is occupied. Thus, in some instances, a data lifecycle in database 510 may be less than a second.

Adaptive timing QoS tuner 520 may include hardware or a combination of hardware and software to determine packet latency for subscriber flows and to determine which subscriber flows are not within timing specifications for latency. Adaptive timing QoS tuner 520 may also provide feedback messages, to network elements, to adjust QoS settings for particular traffic flows. Adaptive timing QoS tuner 520 may perform monitoring 540 of database 510 to identify latencies for a particular subscriber flow (e.g., for a particular application). For example, adaptive timing QoS tuner 520 may compare timestamps (Ti) and device/network segments (Di) from packet data associated with a particular subscriber identifier (Si) and flow (Fi) to determine end-to-end flow latencies and/or network segment latencies.

Adaptive timing QoS tuner 520 may receive maximum latency value 470, which may include particular latency requirements for the subscriber flow and QoS settings. Adaptive timing QoS tuner 520 may compare maximum latency value 470 to actual latencies calculated from the timestamp (Ti), and device/network segment (Di) in database 510 to determine if the actual latency is outside the particular latency requirements for the QoS setting associated with the flow. If a subscriber flow is outside the particular latency requirements, adaptive timing QoS tuner 520 may evaluate the timestamp (Ti) and device/network segment (Di) data associated with the particular flow to determine where, within the flow, the particular congestion is occurring.

Adaptive timing QoS tuner 520 may provide QoS tuning information 480 to one or more particular network elements (e.g., eNB 122, SGW 134, PGW 136, router 405, etc.) to adjust QoS parameters to ensure that the subscriber flow is within timing specifications. In one implementation, adaptive timing QoS tuner 520 may direct QoS tuning information 480 only to particular network elements (e.g., eNB 122, SGW 134, PGW 136, or router 405) that have a subscriber flow that is outside particular latency requirements. In other implementations, adaptive timing QoS tuner 520 may direct QoS tuning information 480 to all or multiple network elements within the subscriber flow path.

In one implementation, QoS tuning information 480 may provide instructions to increase the QoS priority of packets within the subscriber flow that is outside the particular latency requirements. For example, QoS tuning information 480 may instruct a network element (e.g., one or more of eNB 122, SGW 134, PGW 136, etc.) to alter a QCI marking of packets associated with a particular flow to provide increased priority. Additionally, or alternatively, adaptive timing QoS tuner 520 may identify a subscriber flow that is within timing requirements and provide instructions to reduce the QoS priority of one flow to free up resources for a different subscriber flow that is outside of its timing specifications.

In another implementation, latency information system 150 may provide different or additional instructions to network elements to ensure that a subscriber flow is within timing specifications. For example, adaptive timing QoS tuner 520 may send QoS tuning information 480 that includes instructions to increase a queue depth (e.g., at one or more of eNB 122, SGW 134, PGW 136, etc.) for a particular subscriber flow. Additionally, or alternatively, QoS tuning information 480 may include instructions to modify a bandwidth allocation for a particular subscriber flow. For example, eNB 122 may be instructed to increase a downlink bandwidth allocation for a subscriber flow to UE 110. In still another implementation, QoS tuning information 480 may instruct a network element to drop low-priority traffic to provide for more bandwidth. Additionally, QoS tuning information 480 may provide instructions to deny access to services until subscriber flows can be brought within the appropriate timing specifications.

In other implementations, QoS tuning information 480 may include an indication that a subscriber flow that is outside the particular latency requirements and mechanisms for corrective action may be selected/implemented by the network element(s) that receives QoS tuning information 480. For example, eNB 122, SGW 134, and/or PGW 136 may independently implement any of the corrective actions that could be included in QoS tuning information 480 described above.

In some instances, applying (e.g., by one or more of eNB 122, SGW 134, PGW 136, etc.) QoS tuning information 480 may result in overcompensation. Thus, adaptive timing QoS tuner 520 may iteratively provide adjustments to QoS parameters until each subscriber flow is within timing requirements. For example, adaptive timing QoS tuner 520 may continue to monitor database 510 to identify latencies for the particular subscriber flow for which QoS tuning information 480 was previously provided. If a particular network element (e.g., eNB 122, SGW 134, PGW 136, etc.) and/or network segment remains a congestion point for the subscriber flow, adaptive timing QoS tuner 520 may determine if the same network element/segment is causing timing disruptions for multiple flows and verify that the network element has available capacity (e.g., bandwidth) to support all current flows at required QoS levels. If the network element has available capacity to support all current flows at required QoS levels, adaptive timing QoS tuner 520 may continue to monitor and provide adjustments to QoS parameters. However, if the network element does not have available capacity to support all current flows at required QoS levels, adaptive timing QoS tuner 520 may provide alarm signal 550 to initiate corrective action. Alarm signal 550 may, for example, be sent to one or multiple network monitoring sites (not shown), network administrators, and/or network elements in EPC network 130.

Although FIG. 5 shows example functional components of latency information system 150, in other implementations, latency information system 150 may include fewer functional components, different functional components, differently arranged functional components, or additional functional components than depicted in FIG. 5. Alternatively, or additionally, one or more functional components of latency information system 150 may perform one or more other tasks described as being performed by one or more other functional components of latency information system 150.

Figure 6:
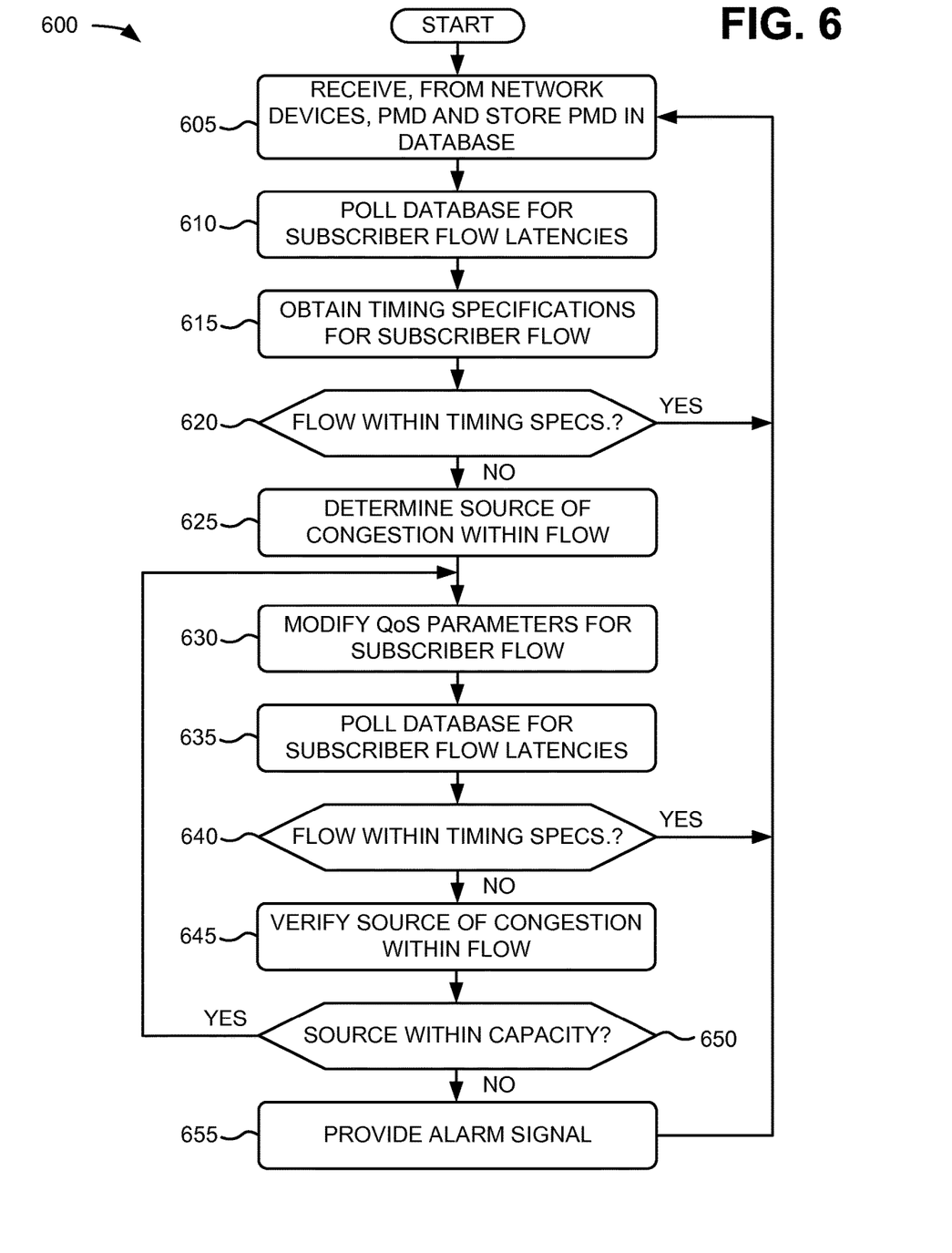
FIGS. 6 and 7 are flow charts of an example process for tuning QoS provisioning based on application latency tolerance specifications according to implementations described herein.
Figure 7:
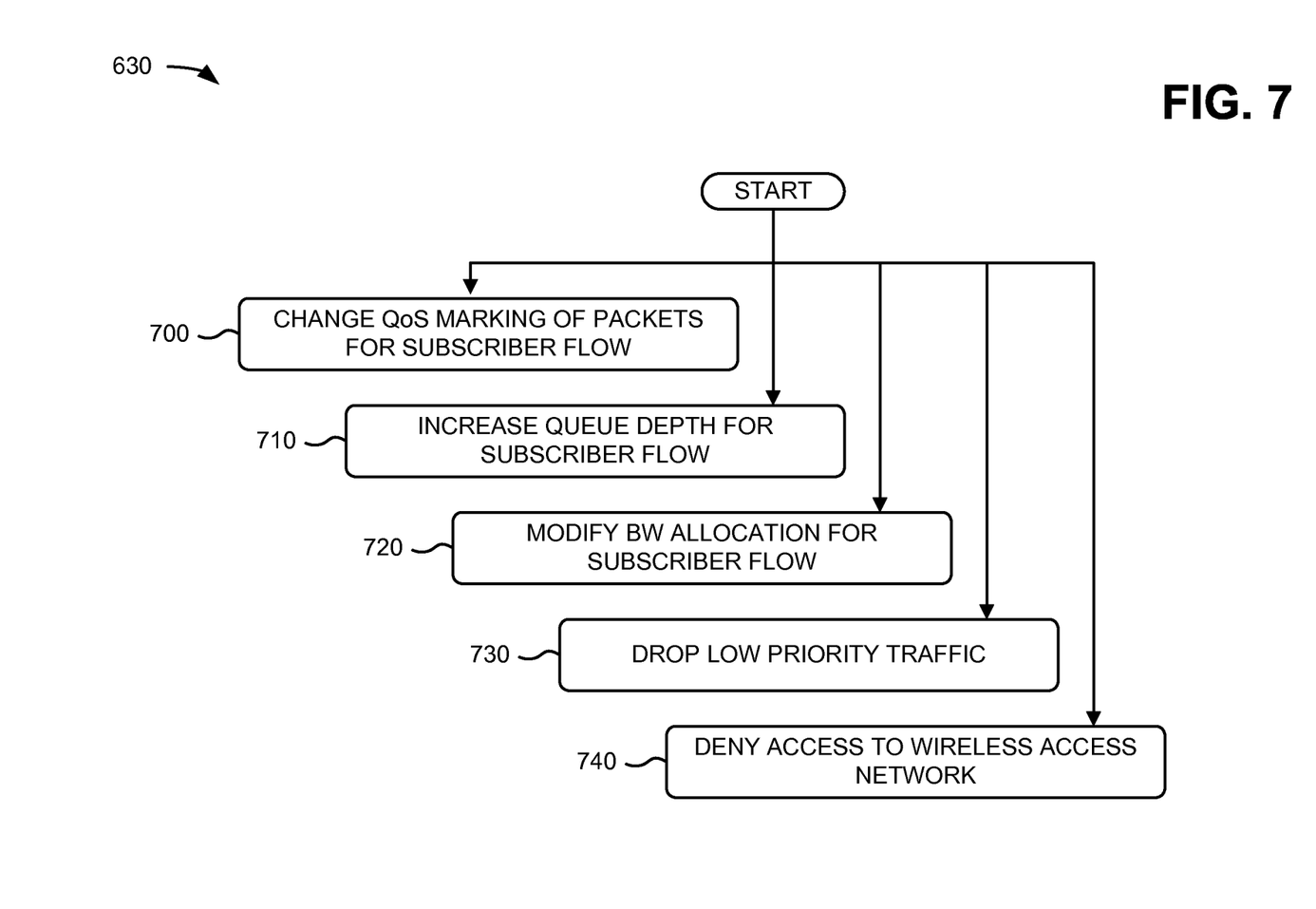

FIGS. 6 and 7 are flow charts of an example process 600 for tuning QoS provisioning based on application latency tolerance specifications according to implementations described herein. In one implementation, process 600 may be performed by latency information system 150. In another implementation, some or all of process 600 may be performed by another device or group of devices, including or excluding latency information system 150.

As shown in FIG. 6, process 600 may include receiving, from network devices, packet monitoring data (PMD) and storing the packet monitoring data in a database (block 605). For example, in implementations described above in connection with FIG. 5, latency information system 150 (e.g., packet monitoring module 500) may receive packet monitoring data 410 from UE 110; packet monitoring data 420 from eNB 122; packet monitoring data 430 from SGW 134; packet monitoring data 440 from PGW 136; and/or packet monitoring data 415, 425, 435, and/or 445 from routers 405. Packet monitoring module 500 may configure the received data as records 530 for storage in database 510. For example, for each record 530, packet monitoring module 500 may store a subscriber identifier (Si) associated with the packet, a flow (Fi) associated with the packet, a timestamp (Ti) associated with the packet, and a device/network segment (Di) associated with the packet.

As further shown in FIG. 6, process 600 may include polling the database for subscriber flow latencies (block 610). For example, in implementations described above in connection with FIG. 5, adaptive timing QoS tuner 520 may perform monitoring 540 of database 510 to identify latencies for a particular subscriber flow (e.g., for a particular application). For example, adaptive timing QoS tuner 520 may compare timestamps (Ti) and device/network segments (Di) from packet data associated with a particular subscriber identifier (Si) and flow (Fi) to determine end-to-end flow latencies and/or network segment latencies.

Process 600 may include obtaining timing specifications for the subscriber flow (block 615), and determining if the flow is within the timing specifications (block 620). For example, in implementations described above in connection with FIG. 5, adaptive timing QoS tuner 520 may receive (e.g., from HSS 142) maximum latency value 470, which may include particular latency requirements for the subscriber flow and QoS settings. Adaptive timing QoS tuner 520 may compare maximum latency value 470 to actual latencies calculated from the timestamp (Ti) and device/network segment (Di) in database 510 to determine if the actual latency is outside the particular latency requirements for the QoS setting associated with the flow.

If the flow is within the timing specifications (block 620—YES), process 600 may return to block 610 to poll the database for additional subscriber flow latencies. If the flow is not within the timing specifications (block 620—NO), process 600 may include determining a source of congestion within the flow (block 625). For example, in implementations described above in connection with FIG. 5, if a subscriber flow is outside the particular latency requirements, adaptive timing QoS tuner 520 may evaluate the timestamp (Ti), and device/network segment (Di) data associated with the particular flow to determine where, within the flow, the particular congestion is occurring.

Still referring to FIG. 6, process 600 may include modifying QoS parameters for the subscriber flow (block 630). For example, in implementations described above in connection with FIG. 5, adaptive timing QoS tuner 520 may provide QoS tuning information 480 to one or more particular network elements (e.g., eNB 122, SGW 134, PGW 136, router 405, etc.) to adjust QoS parameters to ensure that the subscriber flow is within timing specifications.

As further shown in FIG. 6, process 600 may include polling the database for subscriber flow latencies (block 635) and determining if the flow is within the timing specifications (block 640). For example, in implementations described above in connection with FIG. 5, adaptive timing QoS tuner 520 may iteratively provide adjustments to QoS parameters until each subscriber flow is within timing requirements. For example, adaptive timing QoS tuner 520 may continue to monitor database 510 to identify latencies for the particular subscriber flow for which QoS tuning information 480 was previously provided.

If the flow is within the timing specifications (block 640—YES), process 600 may return to block 605 to receive and store additional packet monitoring data. If the flow is not within the timing specifications (block 640—NO), process 600 may include verifying the source of the congestion within the flow (block 645), and determining if the source is within capacity (block 650). For example, in implementations described above in connection with FIG. 5, if a particular network element (e.g., eNB 122, SGW 134, PGW 136, etc.) and/or network segment remains a congestion point for the subscriber flow, adaptive timing QoS tuner 520 may determine if the same network element/segment is causing timing disruptions for multiple flows and verify that the network element has available capacity to support all current flows at required QoS levels.

If the node source is within capacity (block 650—YES), process 600 may return to block 630 to further modify QoS parameters for the subscriber flow. If the node source is not within capacity (block 650—NO), an alarm signal may be provided (block 655). For example, in implementations described above in connection with FIG. 5, if the network element has available capacity to support all current flows at required QoS levels, adaptive timing QoS tuner 520 may continue to monitor and provide adjustments to QoS parameters. However, if the network element does not have available capacity to support all current flows at required QoS levels, adaptive timing QoS tuner 520 may provide alarm signal 550 to initiate corrective action. Alarm signal 550 may, for example, be sent to one or multiple network monitoring sites (not shown), network administrators, and/or network elements in EPC network 130.

Process block 630 may include the process blocks depicted in FIG. 7. As shown in FIG. 7, process block 630 may include changing a QoS marking of packets, at a particular network element, for a subscriber flow (block 700). For example, in implementations described above in connection with FIG. 5, latency information system 150 (e.g., adaptive timing QoS tuner 520) may provide QoS tuning information 480 that includes instructions to increase the QoS priority of packets within the subscriber flow that is outside the particular latency requirements. QoS tuning information 480 may, for example, instruct a network element (e.g., one or more of eNB 122, SGW 134, PGW 136, etc.) to alter a QCI marking of packets associated with a particular flow to provide increased priority. Additionally, or alternatively, adaptive timing QoS tuner 520 may identify a subscriber flow that is within timing requirements and provide instructions to reduce the QoS priority of one flow to free up resources for a different subscriber flow that is outside of its timing specifications.

Process block 630 may further include increasing a queue depth, at a particular network element, for the subscriber flow (block 710), modifying bandwidth allocation, at a particular network element, for the subscriber flow (block 720), dropping low priority traffic (block 730), and/or denying access to the wireless access network (740). For example, in implementations described above in connection with FIG. 5, latency information system 150 (e.g., adaptive timing QoS tuner 520) may provide different or additional instructions to network elements to ensure that a subscriber flow is within timing specifications. For example, adaptive timing QoS tuner 520 may send QoS tuning information 480 that includes instructions to increase a queue depth (e.g., at one or more of eNB 122, SGW 134, PGW 136, etc.) for a particular subscriber flow. Additionally, or alternatively, QoS tuning information 480 may include instructions to modify a bandwidth allocation for a particular subscriber flow. In still another implementation, QoS tuning information 480 may instruct a network element to drop low-priority traffic to provide for more bandwidth. Additionally, QoS tuning information 480 may provide instructions to deny access to services until subscriber flows can be brought within the appropriate timing specifications.

Systems and/or methods described herein may receive packet timing data, from multiple network devices, for subscriber application traffic over an IP wireless access network and may calculate, based on the packet timing data, timing latencies for a particular subscriber flow. The systems and/or methods may retrieve QoS timing specifications for the particular subscriber flow and may determine when the calculated timing latencies for the particular subscriber flow fail to meet the QoS timing specifications for the particular subscriber flow. The systems and/or methods may identify one or more network devices that are causing the particular subscriber flow to fail to meet the QoS timing specifications and may signal the one or more network devices to modify QoS parameters for the particular subscriber flow to improve timing latency for the particular subscriber flow.

The foregoing description of implementations provides illustration and description, but is not intended to be exhaustive or to limit the invention to the precise form disclosed. Modifications and variations are possible in light of the above teachings or may be acquired from practice of the invention. For example, while some descriptions have used terminology associating access network 120 with an LTE network in other implementations an LTE network may be replace with an eHRPD network or another wireless access network.

Furthermore, while series of blocks have been described with regard to FIGS. 6 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions, described herein, may be implemented as a "component" that performs one or more functions. These components may include hardware, such as an ASIC or a FPGA, or a combination of hardware and software.

Even though particular combinations of features are recited in the claims and/or disclosed in the specification, these combinations are not intended to limit disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by one or more computing devices, comprising:
    receiving, by one of the one or more computing devices and from a plurality of network devices, packet monitoring data for subscriber application traffic;
    calculating, by one of the one or more computing devices and based on the packet monitoring data, timing latencies for a particular subscriber flow;
    obtaining, by one of the one or more computing devices, Quality of Service (QoS) timing specifications for the particular subscriber flow;
    determining, by one of the one or more computing devices, that there is congestion within the particular subscriber flow based on the timing latencies for the particular subscriber flow and the QoS timing specifications;
    identifying, by one of the one or more computing devices and when the congestion is detected, at least one of the plurality of network devices that is a source of the congestion; and
    signaling, by one of the one or more computing devices and to the at least one of the plurality of network devices, an indication to modify QoS parameters for the particular subscriber flow.

2. The method of claim 1, further comprising:
    calculating, based on the packet monitoring data, timing latencies for another subscriber flow;
    obtaining other Quality of Service (QoS) timing specifications for the other subscriber flow;
    determining that there are under-utilized resources for the other subscriber flow based on the timing latencies for the other subscriber flow and based on the other QoS timing specifications; and signaling the at least one of the plurality of network devices to modify QoS parameters for the other subscriber flow to benefit timing of the particular subscriber flow.

3. The method of claim 1, further comprising:
storing, in a database, the packet monitoring data.

4. The method of claim 1, where the plurality of network devices includes:
a wireless base station,
a serving gateway (SGW), or
a packet data network (PDN) gateway (PGW).

5. The method of claim 1, where the plurality of network devices are included within an Internet Protocol (IP) wireless access network.

6. The method of claim 1, where the packet monitoring data includes one or more of:
a subscriber identifier associated with a packet provided in the subscriber application traffic,
a flow associated with the packet,
a timestamp associated with the packet, or
a device/network segment associated with the packet.

7. The method of claim 1, further comprising:
calculating, based on the packet monitoring data, timing latencies for multiple other subscriber flows;
obtaining other QoS timing specifications for the multiple other subscriber flows;
determining that there is congestion within the multiple other subscriber flows based on the timing latencies for the multiple other subscriber flows and based on the other QoS timing specifications;
identifying one or more of the plurality of network devices that are the source of the congestion within the multiple other subscriber flows when the congestion within the multiple other subscriber flows is detected; and
sending, to another computing device, an alarm signal indicating the source of the congestion.

8. The method of claim 1, where one of the one or more computing devices includes:
a wireless base station,
a serving gateway (SGW),
a packet data network (PDN) gateway (PGW),
home subscriber server (HSS), or
a latency information system.

9. The method of claim 1, where signaling the indication to modify QoS parameters for the particular subscriber flow includes:
providing instructions to change the QoS marking of packet headers for packets within the particular subscriber flow.

10. A system, comprising:
one or more data collection devices to receive, from a plurality of network devices, packet timing data for subscriber applications over an Internet Protocol (IP) wireless access network;
one or more memories to store the packet timing data; and
one or more computing devices to:
retrieve, from the one or more memories, the packet timing data,
calculate, based on the packet timing data, timing latencies for a particular subscriber flow over the IP wireless access network,
retrieve Quality of Service (QoS) timing specifications for the particular subscriber flow,
determine that the calculated timing latencies for the particular subscriber flow fail to meet the QoS timing specifications for the particular subscriber flow,
identify one or more of the plurality of network devices that are causing the particular subscriber flow to fail to meet the QoS timing specifications, and
instruct the one or more of the plurality of network devices to modify QoS parameters for the particular subscriber flow to improve timing latency for the particular subscriber flow.

11. The system of claim 10, where the packet timing data includes information associated with individual packets, and where the information associated with each individual packet includes:
a subscriber identifier associated with the packet,
a flow associated with the packet,
a timestamp associated with the packet, and
a device/network segment associated with the packet.

12. The system of claim 10, where the one or more computing devices are further to:
identify, based on the packet timing data, the one or more of the plurality of network devices that are causing multiple subscriber flows to fail to meet multiple QoS timing specifications; and
send, to another computing device, an alarm signal indicating that the one or more of the plurality of network devices are causing multiple subscriber flows to fail to meet multiple QoS timing specifications.

13. The system of claim 10, where the one or more computing devices include:
a wireless base station,
a serving gateway (SGW),
a packet data network (PDN) gateway (PGW),
home subscriber server (HSS), or
a latency information server.

14. The system of claim 10, where, when instructing the one or more of the plurality of network devices to modify QoS parameters for the particular subscriber flow, the one or more computing devices are to:
change the QoS marking of packet headers for packets within the particular subscriber flow.

15. The system of claim 10, where the IP wireless access network includes a long-term evolution (LTE) network.

16. The system of claim 10, where the one or more computing devices are further to:
calculate, based on the packet timing data, timing latencies for another subscriber flow,
retrieve other QoS timing specifications for the other subscriber flow,
determine that there are under-utilized resources for the other subscriber flow based on the timing latencies for the other subscriber flow and based on the other QoS timing specifications, and
instruct the one or more of the plurality of network devices to modify QoS parameters for the other subscriber flow to benefit timing of the particular subscriber flow.

17. The system of claim 10, where at least one of the plurality of network devices includes:
a wireless base station,
a serving gateway (SGW), or
a packet data network (PDN) gateway (PGW).

18. A non-transitory computer-readable medium comprising computer-executable instructions, which, when executed by a processor, cause the processor to:
retrieve packet timing data, from a plurality of network devices, for subscriber application traffic provided over an Internet Protocol (IP) wireless access network;
calculate, based on the packet timing data, timing latencies for a particular subscriber flow;

retrieve Quality of Service (QoS) timing specifications for the particular subscriber flow;

determine when the calculated timing latencies for the particular subscriber flow fail to meet the QoS timing specifications for the particular subscriber flow;

identify one or more of the plurality of network devices that are causing the particular subscriber flow to fail to meet the QoS timing specifications; and cause the one or more of the plurality of network devices to modify QoS parameters for the particular subscriber flow to improve timing latency for the particular subscriber flow.

19. The non-transitory computer-readable medium of claim 18, where, when causing the one or more of the plurality of network devices to modify QoS parameters, the computer-executable instructions cause the processor to:

change QoS markings of packet headers for packets within the particular subscriber flow.

20. The non-transitory computer-readable medium of claim 18, where the packet timing data includes:

a subscriber identifier associated with an individual packet, a flow associated with the individual packet, a timestamp associated with the individual packet, and a device/network segment associated with the individual packet.

* * * * *